United States Patent
Sato (10) Patent No.: US 10,478,915 B2
(45) Date of Patent: Nov. 19, 2019

(54) JOINING METHOD

(71) Applicant: ULTEX CORPORATION, Fukuoka-shi, Fukuoka (JP)

(72) Inventor: Shigeru Sato, Fukuoka (JP)

(73) Assignee: ULTEX CORPORATION, Fukuoka-shi, Fukuoka (JP)

( * ) Notice: Subject to any disclaimer, the term of this patent is extended or adjusted under 35 U.S.C. 154(b) by 0 days.

(21) Appl. No.: 15/646,562

(22) Filed: Jul. 11, 2017

(65) Prior Publication Data
US 2018/0015568 A1    Jan. 18, 2018

(30) Foreign Application Priority Data

Jul. 12, 2016 (JP) .................. 2016-138039

(51) Int. Cl.
*B23K 1/06* (2006.01)
*B23K 20/10* (2006.01)
(Continued)

(52) U.S. Cl.
CPC .............. *B23K 20/106* (2013.01); *B06B 1/02* (2013.01); *B23K 20/10* (2013.01); *B23K 20/227* (2013.01);
(Continued)

(58) Field of Classification Search
CPC ..... B29C 65/08; B29C 65/081; B29C 65/082; B29C 65/083; B29C 65/085;
(Continued)

(56) References Cited

U.S. PATENT DOCUMENTS 3,438,824 A * 4/1969 Balamuth ............... B29C 66/63
156/69
3,483,611 A * 12/1969 Balamuth ............... B21J 15/02
156/73.1
(Continued)

FOREIGN PATENT DOCUMENTS

EP      0676272 A2 * 10/1995  ............. B29C 65/08
JP      57046864 A  *  3/1982
(Continued)

OTHER PUBLICATIONS

Machine translation of JP-60009731A (no date available).*

*Primary Examiner* — Kiley S Stoner
(74) *Attorney, Agent, or Firm* — Sughrue Mion, PLLC; Richard C. Turner (57) ABSTRACT

[Solving Means]
A method for joining a plurality of members to be joined composed of metals or materials different in kind from each other which are metal and such an inorganic substance as ceramics to each other, the members being put in a state stacked up and down by having a configuration that a member to be joined 1 is received from an opening of an inside space portion 3 provided in a member to be joined 2 into the inside space portion 3 to be supported by a slope 7 of the inside space portion 3 and the members to be joined 1 and 2 are subjected to a vertical load shown by arrow 14 from a joining tool portion 12 and an anvil 13, while the joining tool portion 12 resonates with acoustic wave vibration or ultrasonic wave vibration transmitted from an acoustic wave vibrator or an ultrasonic wave vibrator to be subjected to vibration in a longitudinal direction shown by arrow 15, so that the members are joined in an ingot-like state, in a diffusion-like state, or in an alloy-like state.

13 Claims, 7 Drawing Sheets (51) Int. Cl.
  *B06B 1/02* (2006.01)
  *B23K 20/227* (2006.01)
  *B23K 20/233* (2006.01)
  *B23K 103/18* (2006.01)
  *B23K 103/00* (2006.01)
  *B23K 103/04* (2006.01)
  *B23K 103/08* (2006.01)
  *B23K 103/10* (2006.01)
  *B23K 103/12* (2006.01)

(52) U.S. Cl.
  CPC ........ *B23K 20/233* (2013.01); *B23K 20/2336* (2013.01); *B23K 2103/04* (2018.08); *B23K 2103/08* (2018.08); *B23K 2103/10* (2018.08); *B23K 2103/12* (2018.08); *B23K 2103/18* (2018.08); *B23K 2103/26* (2018.08); *B23K 2103/52* (2018.08)

(58) Field of Classification Search
  CPC ... B29C 65/086; B29C 65/087; B29C 65/088; B29C 66/951; B29C 65/06; B29C 65/0609; B29C 65/0672; B29C 35/0261; B29C 43/228; B29C 67/244; B29C 2043/3266; B29C 2043/3494; B29C 2043/3636; B29C 2043/5092; B29C 2791/008; B65B 51/225; B23K 20/106; B23K 20/10; B23K 20/227; B23K 20/2336; B23K 20/233; B23K 2103/04; B23K 2103/12; B23K 2103/08; B23K 2103/26; B23K 2103/10; B23K 2103/18; B23K 2103/52; B23K 20/103; B23K 20/12–1215; B06B 1/02
  USPC ..... 228/121–124.7, 580.1–580.2, 73.1–73.6, 228/110.1, 1.1, 112.1, 2.1
  See application file for complete search history.

(56) References Cited

U.S. PATENT DOCUMENTS

| | | | | |
|---|---|---|---|---|
| 3,966,520 A * | 6/1976 | Fallenbeck | ........... | B29C 65/088 156/73.1 |
| 4,259,419 A * | 3/1981 | Uba | ........ | B29C 65/08 429/174 |
| 4,411,720 A * | 10/1983 | Sager | ........ | B29C 65/08 156/580.2 |
| 4,523,710 A * | 6/1985 | Renshaw | ........ | B29C 66/8242 156/73.1 |
| 4,534,819 A * | 8/1985 | Payet | ........ | B29C 65/7443 156/515 |
| 4,701,229 A * | 10/1987 | Arakawa | ........ | B29C 65/08 156/309.6 |
| 4,752,351 A * | 6/1988 | Lunt | ........ | A44B 18/0069 156/261 |
| 4,853,053 A * | 8/1989 | Minjolle | ........ | B28B 1/002 156/73.5 |
| 5,135,592 A * | 8/1992 | Melvin | ........ | B29C 66/1162 156/73.1 |
| 5,163,418 A * | 11/1992 | Fraden | ........ | G01J 5/02 374/158 |
| 5,199,593 A * | 4/1993 | Kita | ........ | B29C 65/08 206/387.1 |
| 5,931,367 A * | 8/1999 | Sato | ........ | B23K 20/106 156/580.1 |
| 7,780,062 B2 * | 8/2010 | Swallow | ........ | B23K 20/122 228/112.1 |
| 8,763,248 B2 * | 7/2014 | Carrier | ........ | B23K 20/129 29/889.2 |
| 9,887,468 B2 * | 2/2018 | Dupuis | ........ | B23K 20/129 |
| 2002/0014514 A1 * | 2/2002 | Shimizu | ........ | B23K 31/12 228/104 |
| 2007/0045385 A1 * | 3/2007 | Okoshi | ........ | B23K 33/006 228/110.1 |
| 2007/0119535 A1 * | 5/2007 | Watanabe | ........ | B23K 20/10 156/73.1 |
| 2008/0199249 A1 * | 8/2008 | Clinch | ........ | F16B 17/00 403/280 |
| 2013/0255619 A1 * | 10/2013 | Mizuno | ........ | B23K 11/093 123/193.5 |
| 2013/0330603 A1 * | 12/2013 | Kroll | ........ | C03C 3/19 429/179 |
| 2014/0150955 A1 * | 6/2014 | Slattery | ........ | B23K 20/1205 156/73.5 |
| 2015/0165718 A1 * | 6/2015 | Wieduwilt | ........ | B31B 1/00 156/73.1 |
| 2015/0235984 A1 * | 8/2015 | Aoyagi | ........ | H01L 24/81 438/107 |
| 2016/0061245 A1 * | 3/2016 | Toyozumi | ........ | B29C 65/08 411/82 |
| 2016/0158876 A1 * | 6/2016 | Cooper | ........ | B23K 20/10 156/73.1 |
| 2018/0141692 A1 * | 5/2018 | Hauck | ........ | B65B 51/225 |
| 2018/0361061 A1 * | 12/2018 | Andretta | ........ | A61M 5/1723 |

FOREIGN PATENT DOCUMENTS

| | | | | |
|---|---|---|---|---|
| JP | 58122821 A | * | 7/1983 | ........... B29C 65/08 |
| JP | 60009731 A | * | 1/1985 | |
| JP | 02285652 A | * | 11/1990 | |
| JP | 03226457 A | * | 10/1991 | ........ B29C 65/562 |
| JP | 06270258 A | * | 9/1994 | ........ B29C 65/08 |
| JP | 2009-113083 A | | 5/2009 | |
| WO | WO-9532833 A1 | * | 12/1995 | ........ B23K 20/129 |

* cited by examiner

JOINING METHOD

TECHNICAL FIELD

The present invention relates to a joining method for joining a plurality of members to be joined composed of metals or materials different in kind from each other which are metal and such an inorganic substance as ceramics, the plurality of members being put in a state stacked up and down.

BACKGROUND ART

A method for joining a plurality of metal-made members to be joined by utilizing ultrasonic wave vibration, which has been disclosed in PTL1, is configured so as to join a plurality of metal members while the plurality of metal members which have been stacked up and down are being subjected to a vertical load applied by a joining tool portion of a resonator and an anvil and vibration in a transverse direction due to ultrasonic wave vibration.

Figure 12:
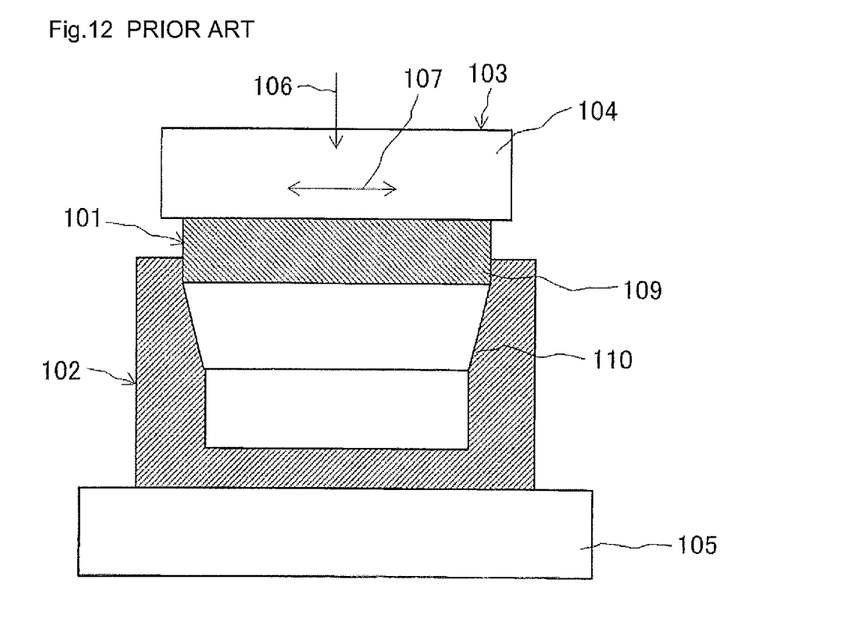
FIG. 12 is an illustrative view showing a plurality of members to be joined which have been stacked up and down by utilizing a conventional method in a vertically sectioned fashion.

However, when a plurality of metal-made members to be joined 101 and 102 which have been stacked up and down are joined to each other by utilizing the joining method disclosed in the above PTL1, the following drawback have been found. When one member to be joined 101 and the other member to be joined 102 of the plurality of metal-made members to be joined 101 and 102 are joined to each other while they are being subjected to a vertical load shown by arrow 106 applied by a joining tool portion 104 of a resonator 103 and an anvil 105 and vibration in a transverse direction shown by arrow 107 due to ultrasonic wave vibration, the plurality of metal-made members cannot be joined in an ingot-like state, in a diffusion-like state, or in an alloy-like state.

PRIOR ART LITERATURE

Patent Literature

[PTL 1] JP 2009-113083A

SUMMARY OF INVENTION

Problem to be Solved by Invention

The present invention has been made in view of the above-described background art, and an object thereof is to provide a joining method for joining a plurality of members to be joined composed of metals or materials different in kind from each other which are metal and such an inorganic substance as ceramics, the plurality of members being put in a state stacked up and down.

Means for Solving the Problem

The present invention is a joining method for joining a plurality of members to be joined composed of metals or materials different in kind from each other which are metal and such an inorganic substance as ceramics, the members being put in a state stacked up and down, wherein an inside space portion having a slope is provided in the other member to be joined of the plurality of members to be joined so as to be opened upward or downward, and in a state where one member to be joined of the plurality of members to be joined is received into the inside space portion from the opening of the other member to be joined to be supported by the slope, an outer peripheral portion of the one member to be joined and the slope of the other member to be joined are joined to each other while a vertical load and vibration in a vertical direction due to acoustic wave vibration or ultrasonic wave vibration are cooperating with each other.

Advantageous Effects of Invention

The present invention achieves such an advantageous effect that the outer peripheral portion of the one member to be joined and the slope of the other member to be joined are joined to each other while a vertical load and vibration in a vertical direction due to acoustic wave vibration or ultrasonic wave vibration are cooperating with each other.

BEST MODE FOR CARRYING OUT INVENTION

Figure 1:
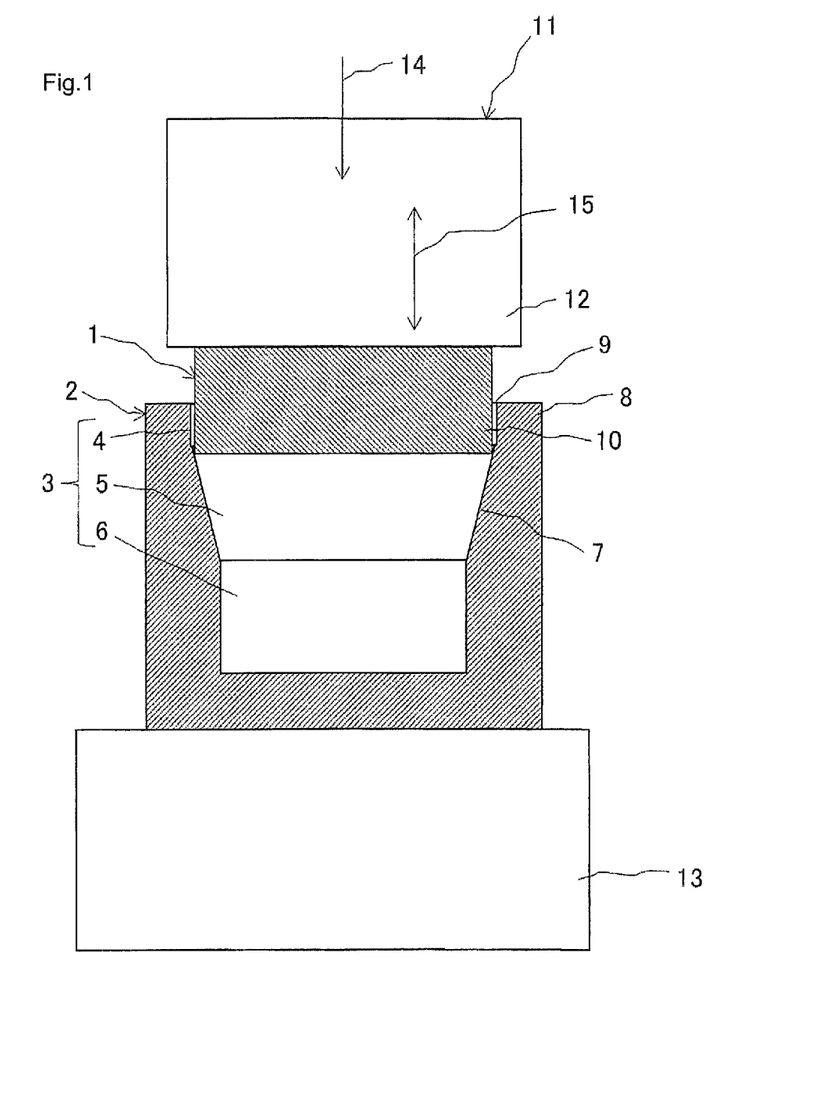
FIG. 1 is an illustrative diagram showing a plurality of members to be joined which have been stacked up and down in a joining method according to an embodiment for carrying out the invention in a vertically sectioned fashion.

With reference to FIG. 1, a joining method according to a best mode for carrying out the invention will be described. As the joining method shown in FIG. 1, a plate-like lid is exemplified as one member to be joined 1 of a plurality of members to be joined 1 and 2 which have been stacked up and down, while a cylindrical container is exemplified as the other member to be joined 2. As the members to be joined 1 and 2, metals of the same kind such as iron, metal applied with metal plating, aluminum, gold, silver, copper, tin, nickel or stainless can be adopted and metals different in kind from each other or materials different in kind from each other which are metal and such as an inorganic substance as ceramics are also adopted.

The other member to be joined 2 has a tubular shape having an inside space portion 3 formed therein. The inside space portion 3 has an aspect where an upper portion thereof is opened upward and an outer peripheral side and a bottom side thereof are closed. The inside space portion 3 is composed of an upper space portion 4, an intermediate space portion 5, and a lower space portion 6. The upper space portion 4, the intermediate space portion 5, and the lower space portion 6 are configured so as to continue coaxially from the top to the bottom of the other member to be joined 2. The upper space portion 4 has a cylindrical shape where it is recessed inside so as to be lower than an upper face of the other member to be joined 2 so that it can horizontally receive the one member to be joined 1 so as to prevent the one member to be joined 1 from moving in a transverse direction. The intermediate space portion 5 is formed in a cone shape surrounded by a slope 7 inclined gradually inside from a lower portion of the upper space portion 4 toward an upper portion of the lower space portion 6. The lower space portion 6 is formed in a cylindrical shape recessed downward from a lower portion of the intermediate space portion 5. That is, the other member to be joined 2 is provided such that the inside space portion 3 having the slope 7 is opened upward.

When the one member to be joined 1 is received in the inside space portion 3 from the opening of the inside space portion 3 provided in the other member to be joined 2 so that it is received in the upper space portion 4 horizontally, a clearance 9 for releasing air when the one member to be joined 1 is received in the upper space portion 4 is formed between the outer peripheral portion of the one member to be joined 1 and a upper wall portion 8 surrounding the upper space portion 4. Since the clearance 9 is formed, the one member to be joined 1 is easily received in the upper space portion 4 horizontally and the one member to be joined 2 received is not moved in the transverse direction, and the outer peripheral portion 10 of the one member to be joined 1 received is supported by the slope 7 on an upper side of the intermediate space portion 5, so that the upper face of the one member to be joined 1 is put in a state where it projects beyond the upper face of the other member to be joined 2.

When the one member to be joined 1 and the other member to be joined 2 are joined to each other by utilizing the joining method shown in FIG. 1, first, a space for receiving a plurality of members to be joined 1 and 2 which have been stacked up and down is secured between a joining tool portion 12 of a resonator 11 and an anvil 13. In this state, the plurality of members to be joined 1 and 2 which have been stacked up and down like the above are placed on the anvil 13 such that a bottom face of the other member to be joined 2 contacts with an upper face of the anvil 13, or after they are placed on the anvil 13 such that the bottom face of the other member to be joined 2 contacts with the upper face of the anvil 13, the one member to be joined 1 is received in the upper space portion 4 of the other member to be joined 2. When the plurality of members to be joined 1 and 2 are placed on the anvil 13 such that the other member 2 contacts with the upper face of the anvil 13, the joining tool portion 12 is spaced upward from the one member to be joined 1.

Next, the resonator 11 is vertically descended by a pressuring mechanism (not shown), and the plurality of members to be joined 1 and 2 which have been stacked up and down are subjected to a vertical load shown by arrow 14 from the joining tool portion 12 of the resonator 11 and the anvil 13, while the joining tool portion 12 resonates with acoustic wave vibration or ultrasonic wave vibration (not shown) coupled to the resonator 11 to be subjected to vibration in a vertical direction shown by arrow 15, so that while the one member to be joined 1 is being subjected to the above load and vibration, it is moved vertically downward to be rubbed against the slope 7 of the other member to be joined 2 along the slope 7 of the other member to be joined 2, which results in ingot-like, diffusion-like or alloy-like joining. The vibration in the vertical direction is a longitudinal vibration vibrating in parallel with the vertical direction in which the plurality of members to be joined 1 and 2 are subjected to the load from the joining tool portion 12 of the resonator 11 and the anvil 13.

According to the joining method shown in FIG. 1, the outer peripheral portion 10 of the one member to be joined 1 and the slope 7 of the other member to be joined 2 of the plurality of members to be joined 1 and 2 which have been stacked up and down like the above are subjected to the vertical load and the vibration in the vertical direction due to the acoustic wave vibration or the ultrasonic wave vibration, the plurality of members 1 and 2 are joined to each other in the ingot-like state, the diffusion-like state, or the alloy-like state. The metals of the same kind are joined in the ingot-like state, the metals different in kind or materials different in kind which are metal and ceramics are joined in the diffusion-like state or in the alloy-like state. The joining can be performed at a normal temperature in the atmosphere in a short time of about several seconds.

As the acoustic wave vibration or the ultrasonic wave vibration used in the joining method shown in FIG. 1, when an experiment was performed at vibration in the vertical direction fixed at one frequency in a range from 10 kHz to 50 kHz, such a fact was confirmed that the metals of the same kind, the metals different in kinds, and the material different in kind which were metal and ceramics could be joined, a joining time was a short time of several second, no void was generated in an interface between the outer peripheral face 10 of the one member to be joined 1 and the slope 7 of the other member to be joined 2, and normal temperature joining of the plurality of members to be joined 1 and 2 in the atmosphere was made possible in the several seconds by the acoustic wave vibration. It should be noted that when the ultrasonic wave vibration was utilized, it was also confirmed that the joining time was made longer than that of the acoustic wave vibration but joining between the metals of the same kind, the metals different in kind, and the materials different in kind which were metal and ceramics were made possible.

In the joining method shown in FIG. 1, such a method can be adopted that up and down of the plurality of members to be joined 1 and 2 which have been stacked up and down are reversed such that the one member to be joined 1 is arranged on a lower side while the other member to be joined 2 is arranged on an upper side, the plurality of members to be joined 1 and 2 are placed on the anvil 13 such that the upper face of the one member to be joined 1 contacts with the upper face of the anvil 13, and the resonator 11 is vertically descended by the pressurizing mechanism (not shown) as shown by arrow 14 so that the joining tool portion 12 of the resonator 11 abuts on the bottom face of the other member to be joined 2 to press the other member to be joined 2 downward. Thus, when up and down of the plurality of members to be joined 1 and 2 which have been stacked up and down are reversed such that the one member to be joined 1 is arranged on the lower side while the other member to be joined 2 is arranged on the upper side, the inside space portion 3 having the slope 7 is provided in the other member to be joined 2 so as to be opened downward, which can lead to such an interpretation that the one member to be joined 1 is received in the inside space portion 3 from the opening of the other member to be joined 2. Further, a surface of the joining tool portion 12 on the side of the member to be joined 1 may be made flat or made uneven so as to raise transmission efficiency of energy. A surface of the anvil 13 on the side of the member to be joined 2 may be made flat or made uneven for gripping. In addition, a resin pad may be arranged regarding one or both of between the joining tool portion 12 and the member to be joined 1 and between the anvil 13 and the member to be joined 2 in a sandwiching manner.

Figure 2:
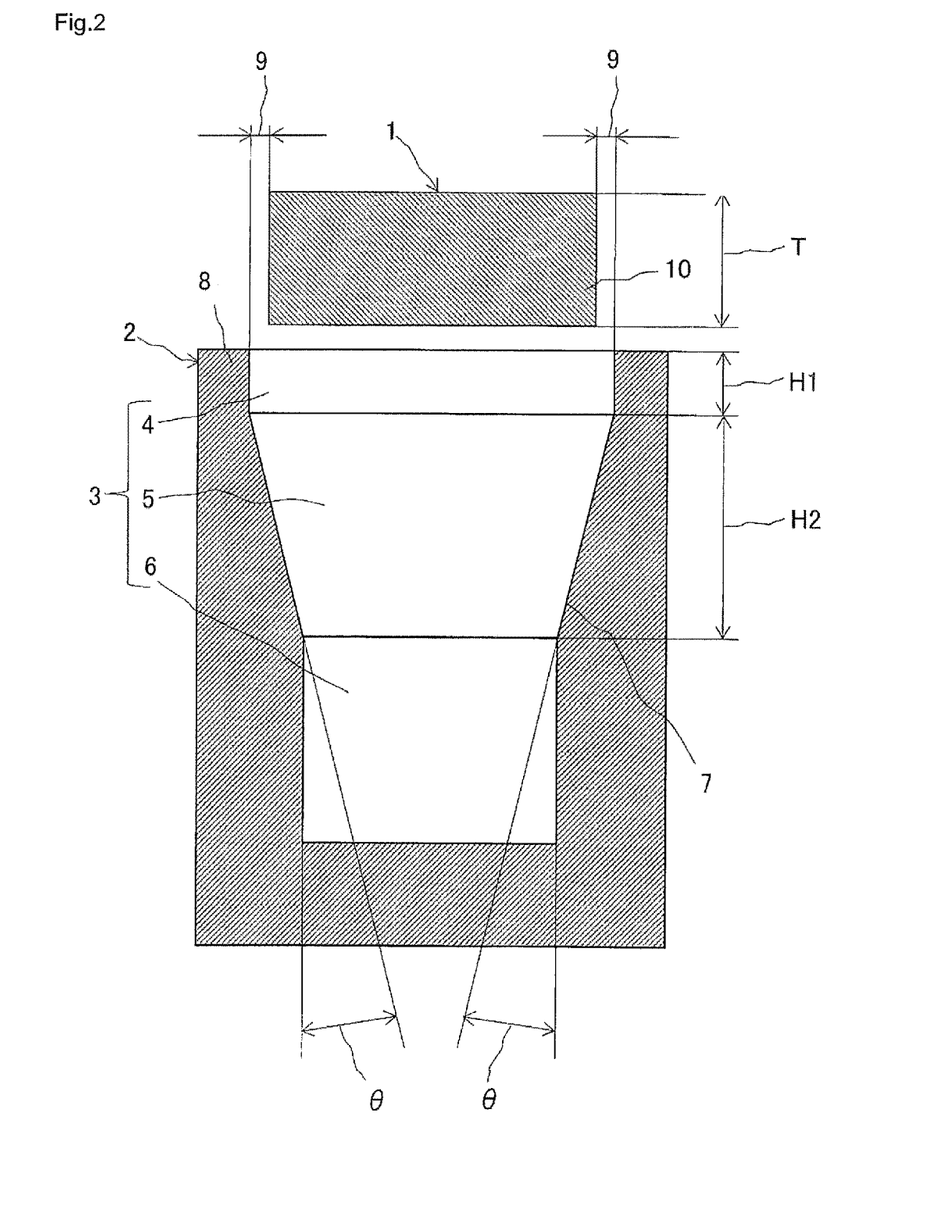
FIG. 2 is a sectional view showing the plurality of members to be joined used in the joining method according to the embodiment for carrying out the invention in a vertically sectioned fashion.

With reference to FIG. 2, the plurality of members to be joined 1 and 2 used in the joining method according the mode for carrying out the invention will be explained. The clearance 9 between the outer peripheral face of the one member to be joined 1 and the upper wall portion 8 of the other member to be joined 2 is not limited to the following numerical value, but, for example, when it is set in a range of 0.03 to 0.05 mm, the one member to be joined 1 is easily received in the upper space portion 4 horizontally, the one member to be joined 1 received is not moved in a transverse direction, and the outer peripheral portion 10 of the one member to be joined 1 received is supported by the slope 7 on the upper side of the intermediate space portion 5.

A vertical size H1 of the upper space portion 4 is smaller than a vertical size T of the one member to be joined 1, and it is not limited to the following numerical value, but, for example, when it is set to a range of 1 to 2 mm, locating of the one member to be joined 1 to the other member to be joined 2 can be achieved. A vertical size H2 of the intermediate space portion 5 is larger than the vertical size T of the one member to be joined 1 (H2>T).

An angle θ formed by the slope 7 surrounding the intermediate space portion 5 and a vertical inner peripheral face surrounding the lower space portion 6 is not limited to the following numeral, but, for example, when it is set to a range of 2° to 3°, the ingot-like joining, the diffusion-like joining, or the alloy-like joining described above is completed. It should be noted that according to the joining method of the present invention, since it is important that the one member to be joined 1 slides on the other member to be joined 2 while the outer peripheral portion 10 in the one member to be joined 1 is applying pressure to the slope 7 of the other member to be joined 2, the above angle θ falling in a range of 10° or less can be adopted, so that a burr which is an unnecessary projection does not project into the intermediate space portion 5. On the other hand, when a plurality of members to be joined 1 and 2 made from thermoplastic resin are joined by utilizing the joining method of the present invention, the above angle θ is generally set to a range of 30° to 60°, and melt thermoplastic synthetic resin projects into the intermediate space portion as the burr which is the unnecessary projection.

In FIG. 2, though not illustrated, a flange portion projecting outward in a transverse direction may be provided on an outer peripheral upper portion of the one member to be joined 1.

Figure 3:
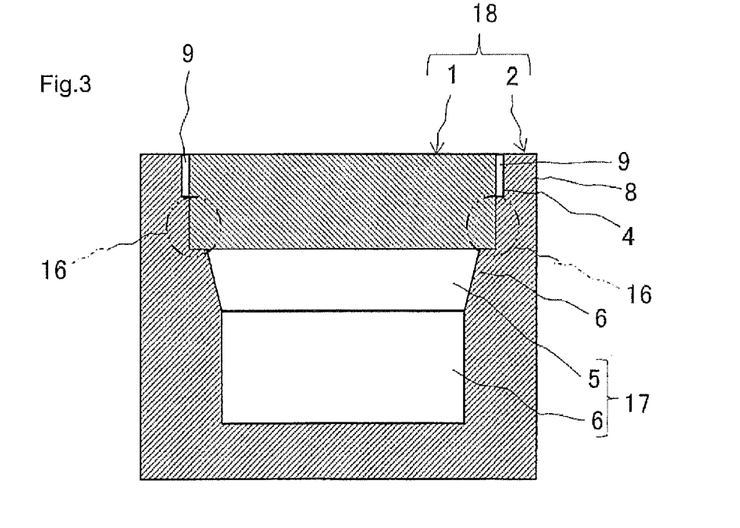
FIG. 3 is a sectional view showing the plurality of members to be joined which have been joined by utilizing the joining method according to the embodiment for carrying out the invention in a vertically sectioned fashion.

With reference to FIG. 3, a structure composed of the plurality of members to be joined 1 and 2 which have been joined by utilizing the joining method according to the mode for carrying out the invention will be described. The clearance 9 opened upward is formed between the outer peripheral face of the one member to be joined 1 and the upper wall portion 8 of the other member to be joined 2.

When the plurality of members to be joined 1 and 2 are composed of metals of the same kind, an interface of the portion surrounded by an imaginary line 16 of the one member to be joined 1 and the other member to be joined 2 located below the clearance 9 is formed in an ingot-like state. When the plurality of members to be joined 1 and 2 are composed of metals different in kind, or when they are composed of materials different in kind which are metal and ceramics, an interface surrounded by the imaginary line 16 is formed in a diffusion-like state or in an alloy-like state. Therefore, it was confirmed that the interface of the portion surrounded by the imaginary line 16 was kept in an air-tight state and it could bear a heat cycle test of a melting temperature or less of the plurality of members to be joined 1 and 2.

The intermediate space portion 5 located below the one member to be joined 1 and the lower space portion 6 are assembled as a structure 18 having a space portion 17 sealed and surrounded by the one member to be joined 1 and the other member to be joined 2. When strain, residual stress, and heat cycle regarding the structure assembled were verified, it could be confirmed that change over time did not occur. Further, regarding the structure 18 assembled, it could be confirmed that no void was generated on the interface of the portion surrounded by the imaginary line 16. The sealed space portion 17 can be filled with liquid or gas, or the sealed space portion 17 can be put in a vacuum state.

Figure 4:
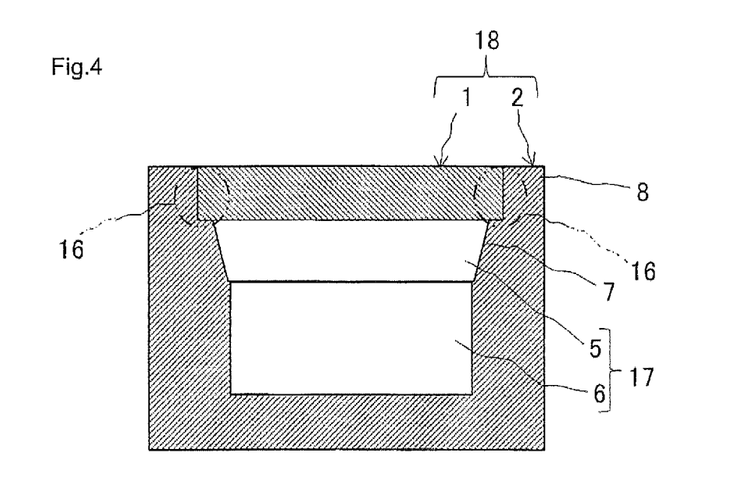
FIG. 4 is a sectional view showing a plurality of members to be joined different in shape from those shown in FIG. 3 which have been joined by utilizing the joining method according to the embodiment for carrying out the invention in a vertically sectioned fashion.

With reference to FIG. 4, a structure 18 composed of the plurality of members to be joined 1 and 2 which have been joined by utilizing the joining method according to the mode for carrying out the invention and different in shape from that shown in FIG. 3 will be described. The structure 18 shown in FIG. 4 has a structure where an upper portion of the one member to be joined 1 and an upper portion of the other member to be joined 2 are shaved so as to remove the clearance 9 in the structure 18 shown in FIG. 3.

Figure 5:
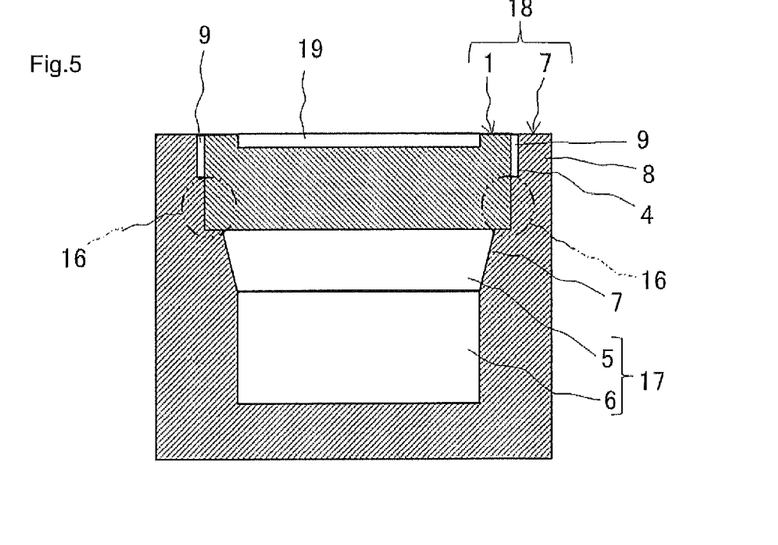
FIG. 5 is a sectional view showing a plurality of members to be joined different in shape from those shown in FIGS. 3 and 4 which have been joined by utilizing the joining method according to the embodiment for carrying out the invention in a vertically sectioned fashion.

With reference to FIG. 5, a structure 18 composed of the plurality of members to be joined 1 and 2 which have been joined by utilizing the joining method according to the mode for carrying out the invention and different in shape from those shown in FIGS. 3 and 4 will be described. The structure shown in FIG. 5 has a structure where a recessed portion 18 is provided in a central portion on an upper portion of the member to be joined 1 in the structure 18 shown in FIG. 3 so that a vertical load and vibration in a vertical direction are focused on the outer peripheral portion 10 of the one member to be joined 1.

Figure 6:
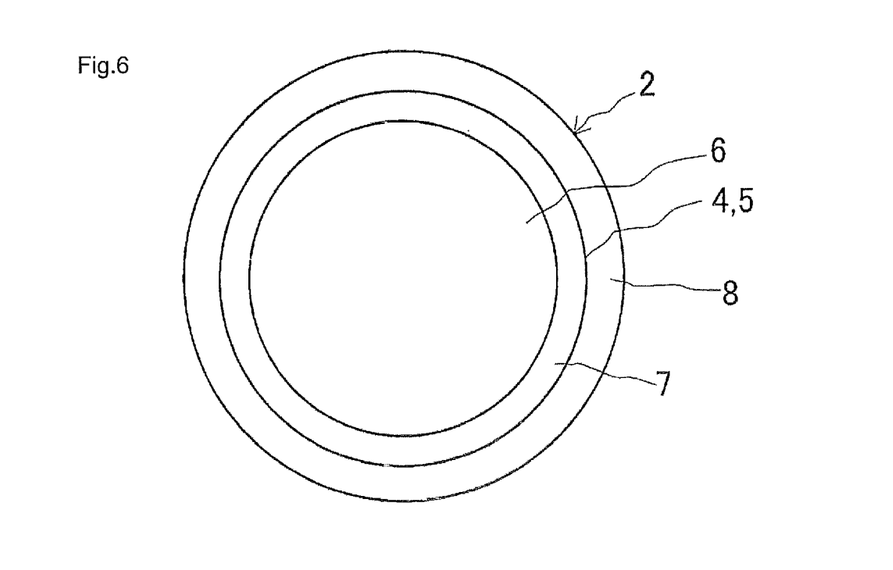
FIG. 6 is a plan view showing the other member to be joined used in the joining method according to the embodiment for carrying out the invention.

With reference to FIG. 6, the other member to be joined 2 used in the joining method according to the mode for carrying out the invention will be described. The upper space portion 4, the intermediate space portion 5 and the lower space portion 6 in the member to be joined 2 shown in FIG. 6 are formed in circular shapes as viewed from the above. That is, the member to be joined 2 is formed in a cylindrical shape. The upper wall portion 8 is formed in a shape circling the upper space portion 4.

Figure 7:
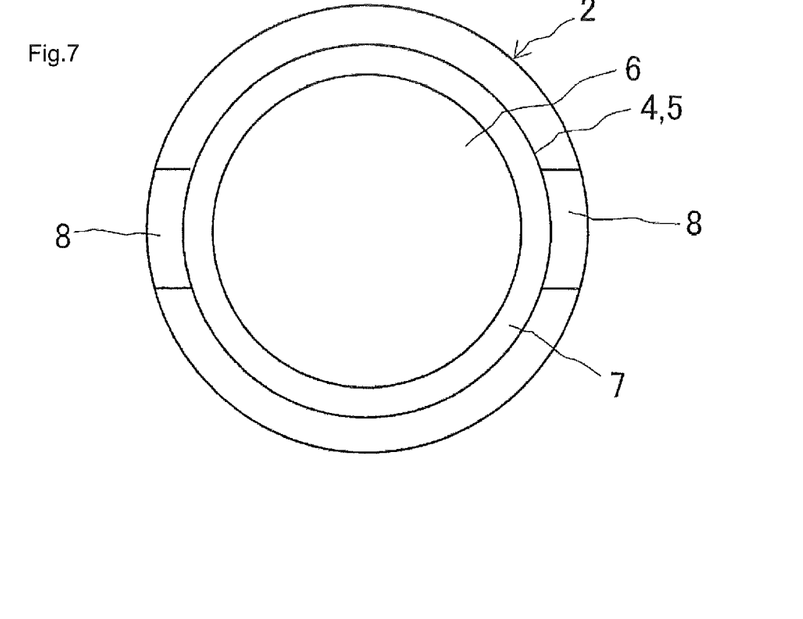
FIG. 7 is a plan view showing the other member to be joined different in shape from that shown in FIG. 6 used in the joining method according to the embodiment for carrying out the invention.

With reference to FIG. 7, the other member to be joined 2 used in the joining method according to the mode for carrying out the invention and different in shape from that shown in FIG. 6 will be described. The upper space portion 4, the intermediate space portion 5 and the lower space portion 6 in the member to be joined 2 shown in FIG. 7 are formed in circular shapes as viewed from the above. That is, the member to be joined 2 is formed in a cylindrical shape. The upper wall portion 8 is provided so as to be divided into a plurality pieces in a direction circling the upper space portion 4. The number of the pieces of the upper wall portion 8 is not limited to two, but it may be three or more.

Figure 8:
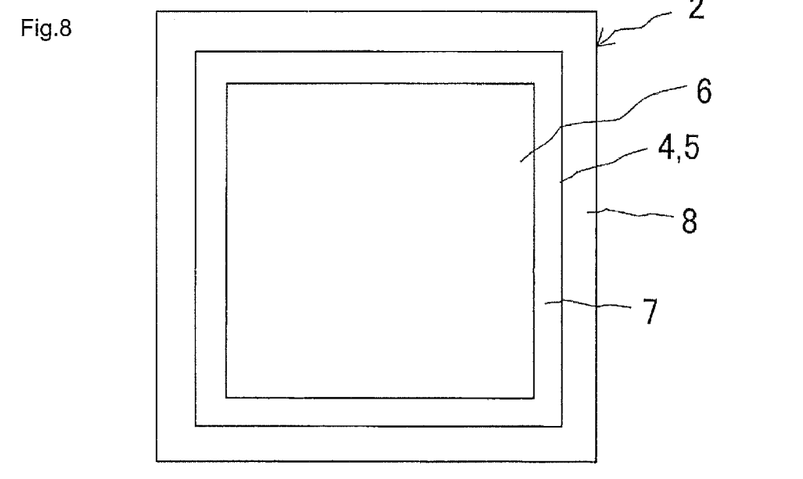
FIG. 8 is a plan view showing the other member to be joined different in shape from those shown in FIGS. 6 and 7 used in the joining method according to the embodiment for carrying out the invention.

With reference to FIG. 8, the other member to be joined 2 used in the joining method according to the mode for carrying out the invention and different in shape from those shown in FIGS. 6 and 7 will be described. The upper space portion 4, the intermediate space portion 5 and the lower space portion 6 in the member to be joined 2 shown in FIG. 8 are formed in square shapes as viewed from the above. That is, the member to be joined 2 is formed in a square tubular shape. The square tubular shape of the member to be joined 2 is not limited to a square shape, but it may be a non-symmetrical shape, an irregular shape, a triangular shape, or a pentagonal shape, or a shape exceeding the pentagonal shape as viewed from the above. The upper wall portion 8 is formed in a shape circling the upper space portion 4.

Figure 9:
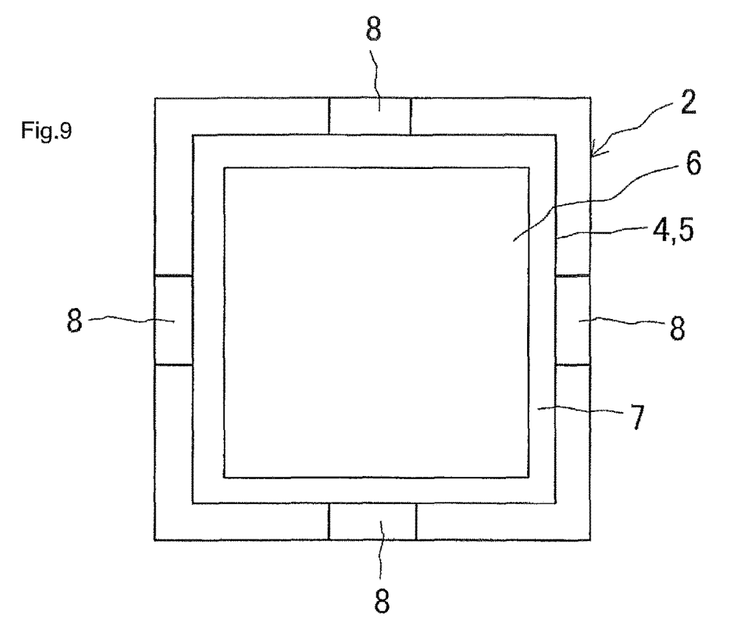
FIG. 9 is a plan view showing the other member to be joined different in shape from those shown in FIGS. 6 to 8 used in the joining method according to the embodiment for carrying out the invention.

With reference to FIG. 9, the other member to be joined 2 used in the joining method according to the mode for carrying out the invention and different in shape from those shown in FIGS. 6 to 8 will be described. The upper space portion 4, the intermediate space portion 5, and the lower space portion 6 in the member to be joined 2 shown in FIG. 8 are formed in square shapes as viewed from the above. That is, the member to be joined 2 is formed in a square tubular shape. The square tubular shape of the member to be joined 2 is not limited to a square shape, but it may be a triangular shape, a pentagonal shape or a shape exceeding pentagonal shape. The upper wall portion 8 is provided so as to be divided into a plurality of pieces in a shape circling the upper space portion 4. The number of the pieces of the upper wall portion 8 is not limited to two, but it may be three or more. In addition, the upper wall portion 8 may be formed in a shape surrounding corners of the upper space portion 4 in an L shape as viewed from the above.

Figure 10:
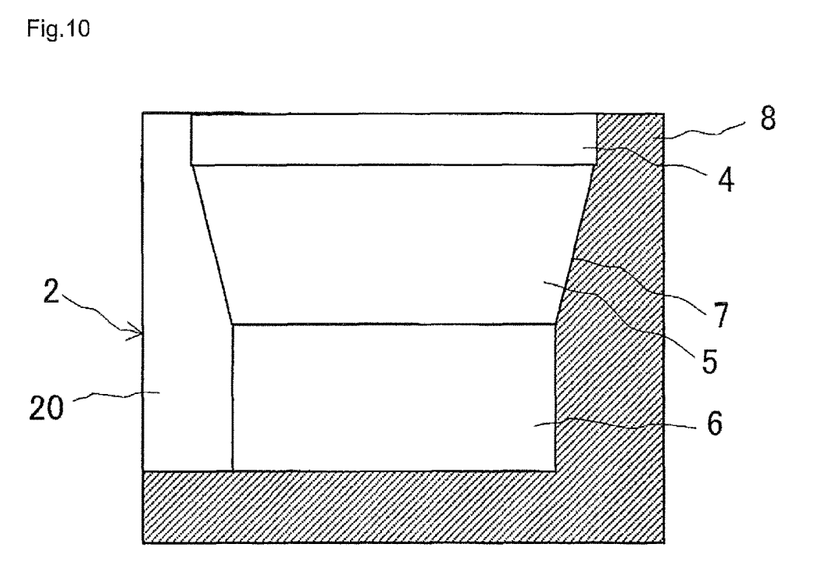
FIG. 10 is a plan view showing the other member to be joined different in shape from those shown in FIGS. 6 to 9 used in the joining method according to the embodiment for carrying out the invention.

With reference to FIG. 10, the other member to be joined 2 used in the joining method according to the mode for carrying out the invention and different in shape from those shown in FIGS. 6 to 9 will be described. A slit 20 is formed in the other member to be joined 2 shown in FIG. 10 to be opened in the upper face and the outer peripheral face of the other member to be joined 2 and the inside space 3, and a peripheral wall portion surrounding the inside space portion 3 composed of the upper space portion 4, the intermediate space portion 5 and the lower space portion 6 is divided into a plurality of pieces by the slit 20 in a circling direction. The slit 20 is not limited to one, but it may be provided in a plural fashion in a direction in which the peripheral wall portion surrounding the inside space portion 3 circles.

Figure 11:
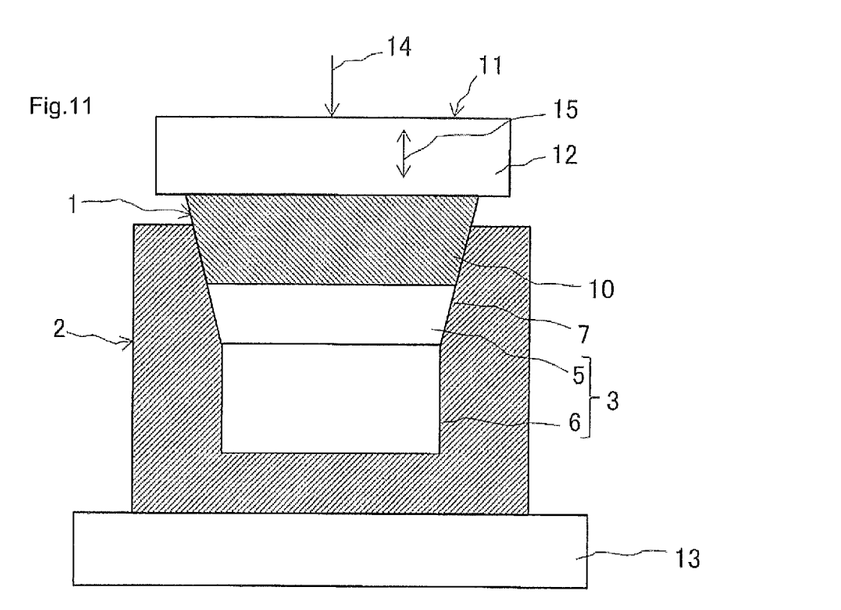
FIG. 11 is a vertical sectional view showing a plurality of members to be joined which have been stacked up and down, the members to be joined being different from those shown in FIG. 1, in the joining method according to the embodiment for carrying out the invention.

With reference to FIG. 11, the plurality of members to be joined 1 and 2 which have been stacked up and down, the members to be joined being different from those shown in FIG. 1, and used in the joining method according to the mode for carrying out the invention will be described. The upper space portion 4 shown in FIG. 1 is removed from the other member to be joined 2 shown in FIG. 11 and the intermediate space portion 5 is formed in a cone shape surrounded by the slope 7 gradually inclined inside from the upper face of the other member to be joined 2 toward the upper portion of the lower space portion 6. The intermediate space portion 5 and the lower space portion 6 constitute the inside space portion 3 in the other member to be joined 2. The lower space portion 6 may have an aspect where the slope 7 of the intermediate space portion 5 is extended downward. When the one member to be joined 1 shown in FIG. 11 is horizontally received in the intermediate space portion 5 from the above, the lower side of the outer peripheral portion of the one member to be joined 1 contacts with a portion of the slope 7 of the intermediate space portion 5 located at an intermediate position in the vertical direction of the slope 7 to be supported by the slope 7, and the upper face of the one member to be joined 1 is put in a state where it projects beyond the upper face of the other member to be joined 2.

While the resonator 11 is vertically descended by the pressurizing mechanism (not shown) as shown by arrow 14, the plurality of members to be joined 1 and 2 which have been stacked up and down are subjected to a vertical load from the joining tool portion 12 of the resonator 11 and the anvil 13, the resonator 11 resonates with acoustic wave vibration or ultrasonic wave vibration transmitted from an acoustic wave vibrator or an ultrasonic wave vibrator (not shown) coupled to the resonator 11 and the joining tool portion 12 of the resonator 11 is subjected to vibration in the vertical direction as shown by an arrow, so that the one member to be joined 1 is moved vertically downward while being subjected to the above load and vibration to be rubbed against the slope 7 of the other member to be joined 2 along the slope 7, which results in joining in an ingot-like state, a diffusion-like state or an alloy-like state.

EXPLANATION OF REFERENCE SIGNS

1 member to be joined
2 member to be joined
3 inside space portion
4 upper space portion
5 intermediate space portion
6 lower space portion
7 slope
8 upper wall portion
9 clearance
10 outer peripheral portion
11 resonator
12 joining tool portion
13 anvil
14 arrow showing vertically descending direction
15 arrow showing vibration in a vertical direction
16 imaginary line surrounding an interface of members to be joined 1 and 2
17 space portion
18 structure
19 recessed portion
20 slit

The invention claimed is:
1. A joining method for joining a plurality of members composed of metal or an inorganic substance, the method comprising:
arranging the plurality of members in a state stacked up and down, wherein an inside space portion having a slope of 10° or less with respect to a vertical direction is provided in a first member of the plurality of members so as to be opened upward or downward, inserting a second member of the plurality of members into the inside space portion from the opening of the first member in a state where an outer peripheral portion of an end portion of the second member is supported by the slope, applying a vertical load and vibration in the vertical direction due to acoustic wave vibration or ultrasonic wave vibration in cooperation with each other to join the outer peripheral portion of the second member to the slope of the first member.

2. The joining method according to claim 1, wherein the inside space portion includes an upper space portion, an intermediate space portion, and a lower space portion, the upper space portion, the intermediate space portion, and the lower space portion being configured so as to continue coaxially from a top to a bottom of the first member, wherein the upper space portion has a cylindrical shape and is configured to receive the second member so as to prevent the second member from moving in a transverse direction, wherein the intermediate space portion is formed in a cone shape including the slope inclined toward a center of the first member from a lower portion of the upper space portion toward an upper portion of the lower space portion, and wherein the lower space portion is formed in a cylindrical shape recessed downward from a lower portion of the intermediate space portion.

3. The joining method according to claim 2, wherein a clearance for releasing air when the second member is received in the upper space portion is formed between the outer peripheral portion of the second member and an upper wall portion surrounding the upper space portion.

4. The joining method according to claim 2, wherein the applying the vertical load and vibration in the vertical direction forms a space portion sealed and surrounded by the second member and the first member.

5. The joining method according to claim 3, further comprising shaving an upper portion of the second member and an upper portion of the first member so as to remove the clearance.

6. The joining method according to claim 1, wherein a recessed portion is provided at a central portion of an upper portion of the second member, wherein the applying the vertical load and the vibration in the vertical direction comprises applying the vertical load and the vibration in the vertical direction to an outer peripheral portion of the second member other than the recessed portion.

7. The joining method according to claim 1, wherein the first member is formed in a cylindrical shape.

8. The joining method according to claim 3, wherein the upper wall portion is divided into a plurality of pieces in a circumferential direction of the upper space portion.

9. The joining method according to claim 1, wherein the first member is formed in a rectangular tubular shape.

10. The joining method according to claim 1, wherein at least one slit is provided in the first member so as to be opened to an upper face, an outer peripheral face, and the inside space portion of the first member.

11. The joining method according to claim 1, wherein the inside space portion includes an intermediate space portion and a lower space portion, the intermediate space portion and the lower space portion being configured so as to continue coaxially from a top to a bottom of the first member, wherein the intermediate space portion is formed in a cone shape including the slope inclined toward a center of the first member from an upper face of the first member toward an upper portion of the lower space portion, and wherein the lower space portion is formed in a cylindrical shape recessed downward from a lower portion of the intermediate space portion, wherein the inserting the second member comprises inserting the second member such that an upper face of the second member projects beyond the upper face of the first member.

12. The joining method according to claim 2, wherein a height of the upper space portion is less than a height of the intermediate space portion.

13. The joining method according to claim 2, wherein a height of the upper space portion is less than a height of the second member.

* * * * *